United States Patent
Weghaus

(10) Patent No.: US 8,923,514 B2
(45) Date of Patent: Dec. 30, 2014

(54) APPARATUS AND METHOD FOR AUTHENTICATION FOR MOTOR VEHICLES

(75) Inventor: Ludger Weghaus, Lippstadt (DE)

(73) Assignee: Hella Kgaa, Lippstadt (DE)

( * ) Notice: Subject to any disclaimer, the term of this patent is extended or adjusted under 35 U.S.C. 154(b) by 82 days.

(21) Appl. No.: 13/212,365

(22) Filed: Aug. 18, 2011

(65) Prior Publication Data

US 2012/0045058 A1  Feb. 23, 2012

(30) Foreign Application Priority Data

Aug. 20, 2010 (DE) .......................... 10 2010 034 976

(51) Int. Cl.
  *G06F 21/00* (2013.01)
  *B60R 25/24* (2013.01)

(52) U.S. Cl.
  CPC ..................................... *B60R 25/24* (2013.01)
  USPC ........... 380/270; 380/259; 380/262; 380/277; 380/44; 726/17; 726/27

(58) Field of Classification Search
  CPC ..... H04L 9/0869; H04L 9/0891; B60R 25/24; B60R 25/241
  USPC ................. 380/255, 259, 360, 262, 270–271, 380/277–278, 44, 46, 28–30; 713/150, 153, 713/168–171; 726/1–2, 16–17, 26–30
  See application file for complete search history.

(56) References Cited

U.S. PATENT DOCUMENTS

| | | | |
|---|---|---|---|
| 4,933,971 A * | 6/1990 | Bestock et al. ................. 380/44 |
| 5,144,667 A * | 9/1992 | Pogue et al. .................... 380/45 |
| 5,506,905 A * | 4/1996 | Markowski et al. .......... 380/262 |
| 5,668,880 A * | 9/1997 | Alajajian ....................... 370/342 |
| 5,991,405 A * | 11/1999 | Mills .............................. 380/247 |
| 6,148,404 A * | 11/2000 | Yatsukawa ........................ 726/2 |
| 6,778,064 B1 * | 8/2004 | Yamasaki ..................... 340/5.21 |
| 2002/0138850 A1* | 9/2002 | Basil et al. .................... 725/117 |
| 2005/0090267 A1* | 4/2005 | Kotzin ....................... 455/456.4 |
| 2005/0108576 A1* | 5/2005 | Munshi ......................... 713/201 |
| 2006/0085644 A1* | 4/2006 | Isozaki et al. ................ 713/171 |
| 2006/0214766 A1* | 9/2006 | Ghabra et al. ............... 340/5.25 |
| 2008/0102795 A1* | 5/2008 | Johur ............................. 455/411 |
| 2008/0112563 A1* | 5/2008 | Choi ............................... 380/44 |
| 2008/0169898 A1* | 7/2008 | Kato et al. ..................... 340/5.1 |
| 2009/0288125 A1* | 11/2009 | Morioka ........................ 725/110 |
| 2009/0323972 A1* | 12/2009 | Kohno et al. ................. 380/284 |
| 2010/0034383 A1* | 2/2010 | Turk .............................. 380/262 |

\* cited by examiner

*Primary Examiner* — Joseph P. Hirl
*Assistant Examiner* — John B King
(74) *Attorney, Agent, or Firm* — Husch Blackwell LLP

(57) ABSTRACT

An arrangement on monitoring of authentication, in particular for motor vehicles, includes a first communication apparatus and at least a second communication apparatus, between which a wireless communication channel can be set up. The communication apparatus items have means for authentication and encryption, with which the exchangeable data may be encrypted via the communication channel. The items of communication apparatus have storage means in which one of the digital keys usable for authentication and encryption can be stored, and in that in the storage device there is either in addition to the digital key and/or in the individual key at least one piece of information regarding at least one past communication between the first communication apparatus and the second apparatus that can be stored in memory.

11 Claims, 2 Drawing Sheets

APPARATUS AND METHOD FOR AUTHENTICATION FOR MOTOR VEHICLES

CROSS REFERENCE TO RELATED APPLICATION

This application claims priority to German Patent Application No. 10 2010 034 976.3 filed Aug. 20, 2010.

FIELD OF THE INVENTION

The invention concerns an arrangement for monitoring authentication, in particular for motor vehicles, including at least a first communication apparatus and at least a second communication apparatus, between which at least one wireless communication channel may be set up, in which the pieces of the communication apparatus have authentication and encryption means, with which data exchangeable over the communication channel can be encrypted.

DESCRIPTION OF RELATED ART

The use of such arrangements for monitoring of authentication is in particular known in the test of authentication of what are called broadcast keys in motor vehicles. These broadcast keys, which will be called radio telemetry servers below, allow by pressing on a button to decrypt or to encrypt a motor vehicle by means of a central encryption unit.

The arrangements, which have been known for a long time, and in part use uni-directional communication channels, have shown their usefulness in great numbers. Data are transferred through these communication channels as encrypted data. Based on the increasing computing power, successful hacker attacks on these arrangements cannot be excluded. In this situation, a stronger encryption of exchangeable data is desirable. Strong encryption is for example possible with the AES algorithm.

From the area of what is called Consumer Electronics, several procedures are known that use bi-directional communication channels. It is expected that components for these procedures, particularly integrated switching circuits, can be manufactured in large numbers relatively economically. Such procedures are known under the catchwords BTLE (Bluetooth Low Energy) and NFC (Near Field Communication).

A communication encrypted with the AES algorithm over BTLE or NFC communication channels is currently the object of development in many companies.

The integrated switching circuits that have been known for some time do not allow the digital keys necessary for encrypting the AES algorithm to be stored with reasonably high security. Because of the current focus of development on uses in Consumer Electronics, it is not to be expected that sufficiently safe storage possibilities will be created in future integrated switching circuits.

It is much more to be expected that storage elements outside the integrated switching circuits must be used, which however only with special effort can be secured against unauthenticated access.

The invention therefore is based on proposing an arrangement for monitoring of authentication that allows the simplest possible authentication monitoring that at the same time is as strong as possible.

BRIEF SUMMARY OF THE INVENTION

According to the invention, this task is solved in that the items of the communication apparatus have storage means, in which one of the digital keys used for the authentication and encryption means may be stored, and that in the storage means either in addition to the digital key and/or in the digital key at least one piece of information on at least one past communication between the first and second communication apparatus may be stored.

The invention allows known communication processes like BTLE and NFC to be used for access monitoring without having to give up on the required security. It is preferred, therefore, in an arrangement according to the invention for the communication based on the BTLE and/or the NFC standard for means appropriate for the flow of communication to be used. The use of communication procedures used otherwise in Consumer Electronics allows access to new applications. A connection between a mobile radio device and an arrangement for monitoring of authentication in a motor vehicle is thus possible with simple means.

The use of at least one piece of information of at least one past communication between the first and second communication apparatus has as a result an additional gain in security in the monitoring of the authentication. Since the information changes from communication to communication in at least the first communication means and in at least a second communication means in the same manner, access is possible with a communication means with for example a second communication means that in the meantime has a copied digital key and copied information of at least one past communication between the first and second communication apparatus only within a time period from the time of the creation of the copy and the first authenticated communication between this second communication means and the first communication means. After such an authenticated communication, at least the information of at least one past communication between the first and second communication apparatus changes, and the copied information is therefore now obsolete.

If within this time period a communication takes place between the communication means with the copied digital key and the copied information of at least one past communication between the first and the second communication apparatus, this unauthenticated communication cannot be prevented, but it will become known afterwards, since the authenticated user then has stored no valid information of at least one past communication between the first and the second communication apparatus in his second communication apparatus. The authentication is then refused, something that is always an occasion for review and further measures that re-create the authentication (for example, new programming of the arrangement for monitoring the authentication). In this way the copy of the authentication is removed.

For authentication of the first and/or second communication means via the communication channel, the authentication data encrypted with a digital key can be transferable from the first to the second communication means and/or the reverse. The possibility exists that for authentication of the first and/or second communication means via the communication channel the stored information of at least one past communication from the first communication channel is transferred to the second communication means or the reverse. The stored information of at least one past communication can be a part of the encrypted authentication data or can be transferred in addition to the authentication data.

After a successful authentication, the digital key, or, if an asymmetrical encryption procedure is used, the digital keys in the first authentication and encryption means and or the second authentication and encryption means can be changed. This makes sense if dynamic keys are used. The altered key or the altered keys can preferably be transferred encrypted from the first communication means to the second communication means and/or the reverse.

After a successful authentication, the information of at least one past communication is changeable through the authentication and encryption means of the first communication apparatus or the second communication apparatus after a changed rule that depends on information from the current communication, and may be transferred through the communication channel to the other communication apparatus and may be stored in the storage means of both items of communication apparatus.

Alternatively, after a successful authentication the minimum of one piece of information and the minimum of one past communication can be changed through the first authentication and encryption means and the second authentication and encryption means after a similar change rule depending on at least one piece of information over a current communication.

An arrangement according to the invention can have exactly one first communication apparatus and at least 2 second communication pieces of apparatus, in which the first communication apparatus is set up in a motor vehicle and the second pieces of communication apparatus are set up in radio telemetry servers.

In the storage means of the first communication apparatus, according to the invention for each second communication apparatus a digital key and if necessary at least one piece of information of at least one past communication can be stored.

BRIEF DESCRIPTION OF THE SEVERAL VIEWS OF THE DRAWINGS

The figures attached hereto are taken to further explain the invention.

The following is shown.

DETAILED DESCRIPTION OF THE INVENTION

Figure 1:
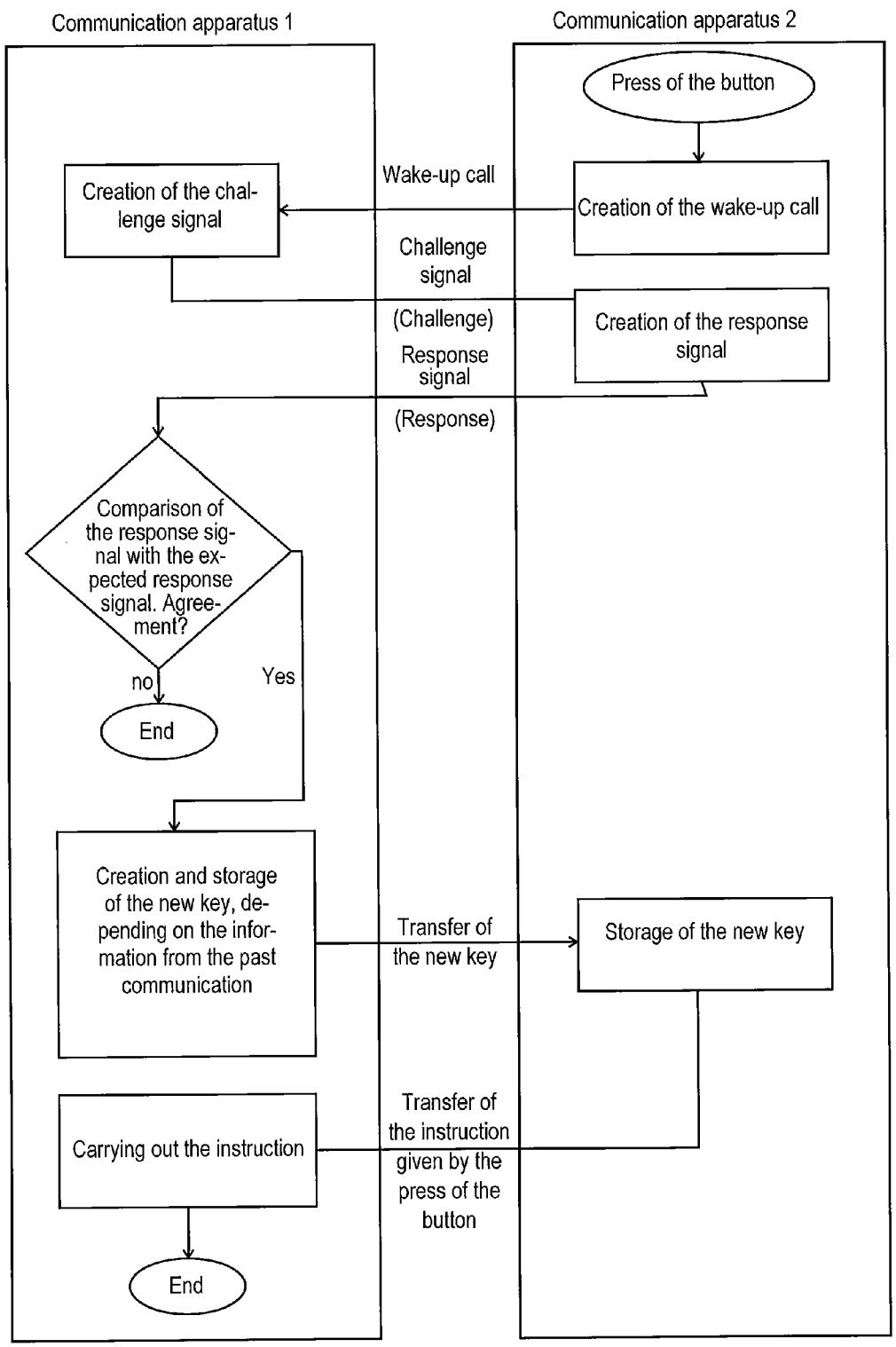
FIG. 1 a procedure with which a first arrangement according to the invention works, and FIG. 2 a procedure with which a second arrangement according to the invention works.
Figure 2:
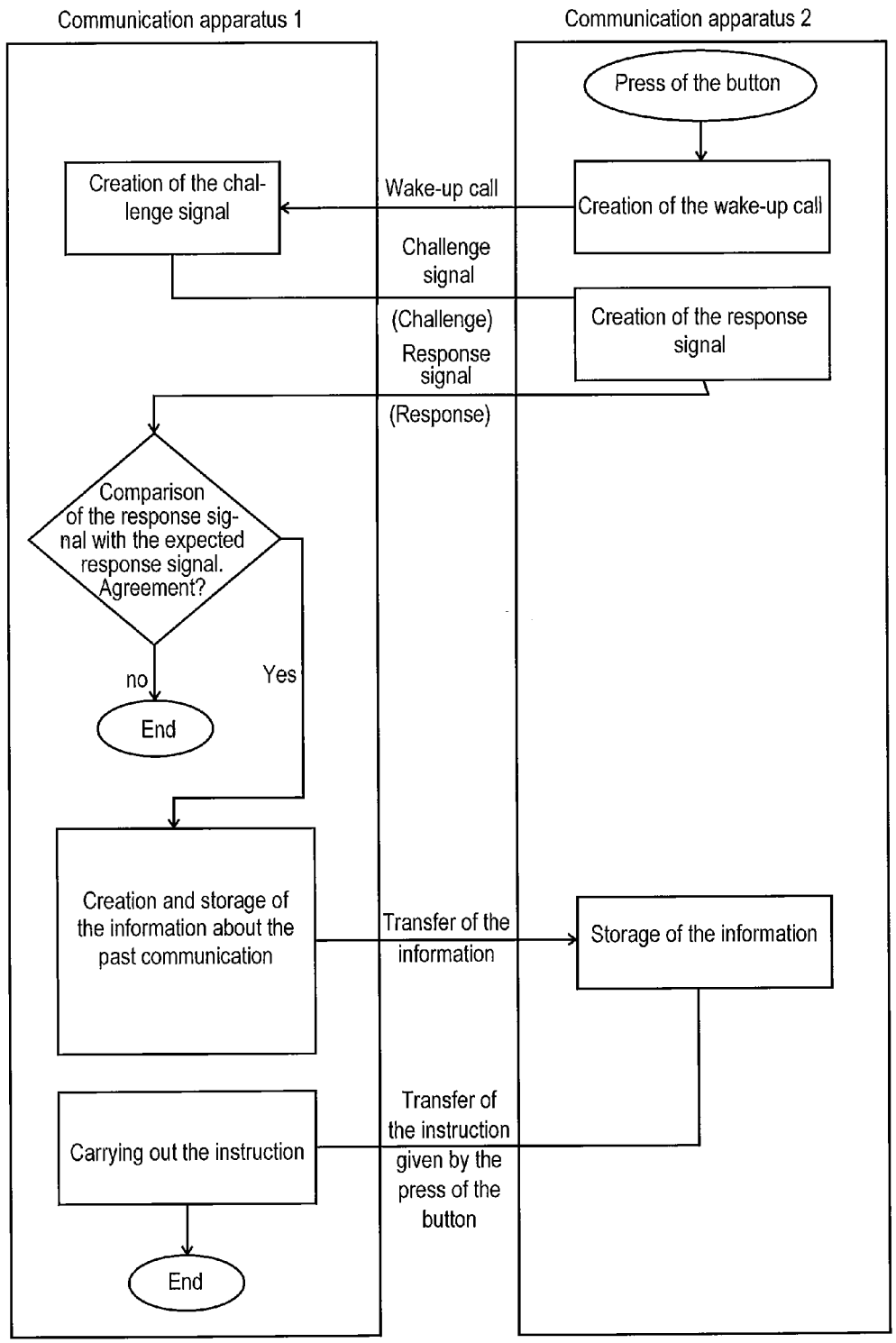

The first arrangement according to the invention, which works according to the first procedure shown in FIG. 1, and like the second system according to the invention, which has a procedure shown in FIG. 2, also has a first communication apparatus and several second pieces of communication apparatus. The first communication apparatus is set up in a motor vehicle, while the second is set up in radio telemetry servers for decrypting and encrypting the same motor vehicle.

As an example, bi-directional communication channels may be set up between the first communication apparatus on one hand and the second communication apparatus items on the other with BTLE or NFC technology.

Encryption of current communication over the communication channels can occur by means of the AES algorithm, in which a symmetrical procedure is involved.

The first communication apparatus and the second pieces of communication apparatus each have an authentication and encryption means and a storage means. The authentication and encryption means can be provided for in integrated switching circuits. The storage devices can be separate construction elements, but they can also exist in the integrated switching circuits.

Both examples of embodiments can be operated in the following manner: By the press of a button of one of the radio telemetry servers, a communication is sent between the second communication apparatus in the activated radio telemetry server and the first communication apparatus in the motor vehicle.

Initially, the push of the button sends a wake-up signal from the second communication apparatus to the first communication apparatus. The first communication apparatus answers with a challenge signal, which is transformed in the second communication apparatus by using the digital keys stored there. The result of the transformation is sent as a response signal to the first communication apparatus. At the same time, in the first communication apparatus a transformation of the challenge signal also occurs depending on the digital keys stored in the first communication apparatus.

The results of the transformation in the second communication apparatus and the first communication apparatus are compared in the first communication apparatus. If the two results agree, the transformation in the communication apparatus items occurs with the same digital keys, for which reason the radio telemetry server that is outfitted with the second communication apparatus gives the authentication for decryption and encryption of the motor vehicle outfitted with the first communication apparatus.

Up to this point the procedures under which the two embodiments work do not differ from the current state of the art.

The procedure according to which the first embodiment works functions with so-called dynamic keys, which can be changed after a successful monitoring of authentication. For this purpose, a new digital key is created in the first communication apparatus, which on the one hand is stored in the storage means of the first communication apparatus. Setting aside here occurs by allocating to the second communication apparatus, with which a successful monitoring of authentication has taken place. On the other hand, the new digital key that is encrypted to the second communication apparatus is transferred and set aside in the storage means of the second communication apparatus. The new digital key then stands available for another monitoring of authentication and communication.

In the first embodiment, the creation of the digital key occurs depending on at least one piece of information of at least one past communication between the first and second communication apparatus. Thus the digital key contains at least one piece of information of at least one past communication between the first and the second communication apparatus.

This at least one piece of information can be of any type. For example, it can involve any kind of sign that was selected by chance during the past communication. However, it can also refer to the date or the time of the past communication, in particular the last successful communication.

In the second embodiment, a static, digital key is used, which does not depend on at least one piece of information or at least one past communication between the first and the second communication apparatus. Instead, the information on at least one past communication between the first and second communication apparatus is stored in the storage means of the first communication apparatus and the storage means of the second communication apparatus. The digital key itself contains no information regarding a past communication. Therefore, in the second embodiment not only is the agreement of the digital key necessary for a successful monitoring of authentication, but agreement between the piece of information stored in the storage means with at least one past communication is also necessary. For this purpose, the information stored in the second communication apparatus is transferred to the first communication apparatus. There this stored information is compared. If these agree, the radio telemetry server outfitted with the second communication apparatus authenticates the decryption and encryption of the motor vehicle.

If authentication is set, the instruction transmitted by the initial press of a button is carried out both in the first embodiment and in the second embodiment.

Summary (FIG. 1) The invention concerns an arrangement for monitoring authentication, in particular for motor vehicles, including at least a first communication apparatus and at least a second communication apparatus, between which at least one wireless communication channel may be set up, in which the pieces of the communication apparatus have authentication and encryption means, with which data exchangeable over the communication channel can be encrypted.

The invention therefore is based on proposing an arrangement for monitoring authentication that allows the simplest possible authentication monitoring that at the same time is as strong as possible.

According to the invention, this task is solved in that the items of the communication apparatus have storage means, in which one of the digital keys used for the authentication and encryption means may be stored, and that in the storage means either in addition to the digital key and/or in the digital key at least one piece of information on at least one past communication between the first and second communication apparatus may be stored.

What is claimed is:

1. An arrangement for monitoring of authentication, in particular for motor vehicles, comprising:
   a first communication apparatus and at least a second communication apparatus, between which a wireless communication channel can be set up,
   the first and second communication apparatuses each having an authentication element and an encryption element, with which exchangeable data is encrypted via the wireless communication channel;
   each of the first and second communication apparatuses having a memory in which a dynamic digital key used for authentication and encryption is stored; and
   at least one piece of information regarding at least one past communication between the first communication apparatus and the second communication apparatus being stored in at least one of the first or second communication apparatuses, wherein said at least one piece of information is separate from authentication data and includes at least one of a time and date of at least one past communication; and
   wherein the first communication apparatus modifies the dynamic digital key based on the at least one piece of information and transmits the modified dynamic digital key to the second communication apparatus for use in a subsequent communication;
   wherein said modified dynamic digital key is stored in said memory of each of said first and second communication apparatuses for use in subsequent authentication and encryption.

2. The arrangement according to claim 1, wherein for authentication of the first and/or second communication apparatuses via the wireless communication channel, authentication data encrypted with the digital key are transferable from the first communication apparatus to the second communication apparatus and/or the reverse.

3. The arrangement according to claim 2, wherein for authentication of the first and/or second communication apparatuses via the wireless communication channel the stored piece of information regarding at least one past communication is transferable between the first communication apparatus and the second communication apparatus.

4. The arrangement according to claim 3, wherein the stored piece of information of at least one past communication is part of the encrypted authentication data or is in addition to the authentication data and is transferable.

5. The arrangement according to claim 1 wherein after a successful authentication of the digital key the digital key is changeable in the first authentication and encryption elements of the first or second communication apparatus.

6. The arrangement according to claim 5, wherein the changed digital key is transferable from the first communication apparatus to the second communication apparatus and/or the reverse.

7. The arrangement according to claim 1 wherein after a successful authentication, the stored piece of information of at least one past communication is changeable through the authentication and encryption elements of the first communication apparatus or the second communication apparatus after a change rule that depends on information from the current communication, and may be transferred through the communication channel to the other communication apparatus and may be stored in the memory of both the first communication apparatus and the second communication apparatus.

8. The arrangement according to claim 1 wherein after a successful authentication the stored piece of information of at least one past communication is changeable through the authentication and encryption elements of the first or second communication apparatus after an identical change rule, depending on at least one equivalent piece of information via a current communication.

9. The arrangement according to claim 1 further comprising exactly a first communication apparatus and at least 2 second communication apparatuses, wherein the first communication apparatus is set up in a motor vehicle and the second communication apparatus is set up in a radio telemetry service.

10. The arrangement according to claim 9, wherein the memory of the first communication apparatus stores, according to the second communication apparatus, a digital key and the at least one piece of information of at least one past communication.

11. An arrangement for monitoring of authentication, in particular for motor vehicles, comprising:
   a first communication apparatus and at least a second communication apparatus, between which a wireless communication channel can be set up,
   the first and second communication apparatuses each having an authentication element and an encryption element, with which exchangeable data is encrypted via the wireless communication channel;
   each of the first and second communication apparatuses having a memory in which a static digital key used for authentication and encryption is stored; and
   at least one piece of information regarding at least one past communication between the first communication apparatus and the second communication apparatus being stored in at least one of the first or second communication apparatuses, wherein said at least one piece of information is separate from authentication data and includes at least one of a time and date of at least one past communication; and
   wherein the second communication apparatus transmits the at least one piece of information to the first communication apparatus for comparison to the at least one piece of information stored in the first communication apparatus, such that both the static digital key and said at least one piece of information must agree in order for authentication to occur.

\* \* \* \* \*